United States Patent [19]

Engdahl et al.

[11] Patent Number: 4,684,958

[45] Date of Patent: Aug. 4, 1987

[54] SEISMIC DISPLACEMENT RECORDER FOR BASE-ISOLATED STRUCTURES

[75] Inventors: Paul D. Engdahl, 2850 Monterey Ave., Costa Mesa, Calif. 92626; Roger P. Engdahl, Santa Ana, Calif.

[73] Assignee: Paul D. Engdahl, Costa Mesa, Calif.

[21] Appl. No.: 847,661

[22] Filed: Apr. 3, 1986

[51] Int. Cl.$^4$ .................... G01D 9/00; G01D 15/02; G01M 1/00; G01M 5/00

[52] U.S. Cl. .................... 346/7; 346/77 R; 73/786; 73/594

[58] Field of Search .......... 346/7, 77 R, 33 C, 112, 346/124, 125, 126; 73/786, 594

[56] References Cited

U.S. PATENT DOCUMENTS 2,474,400  3/1945  Van Degrift .................. 346/7
3,795,006  2/1987  Engdahl .................. 346/7

Primary Examiner—Clifford C. Shaw
Assistant Examiner—Mark Reinhart
Attorney, Agent, or Firm—Lawrence Fleming

[57] ABSTRACT

A mechanical seismic instrument for recording relative horizontal displacements between the base and foundation of base-isolated buildings or other large structures during earthquakes. A rigid tripod-like arm is connected to the base of the structure; on the other end of the arm is a marking stylus. A record plate is connected to the foundation. When base and foundation move relative to one another, the stylus scribes a record trace on the record plate. Arm and record plate are mounted respectively on mounting plates which are connected and covered by a flexible enclosure. Timing marks on the record trace may be made by striking devices which tap against the shank of the stylus.

10 Claims, 10 Drawing Figures

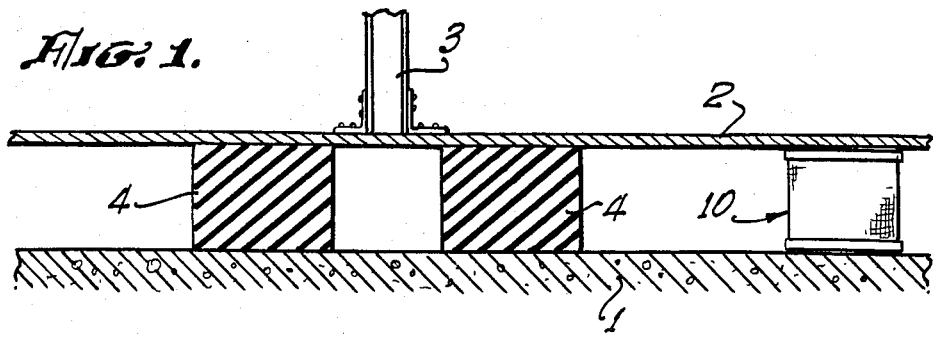
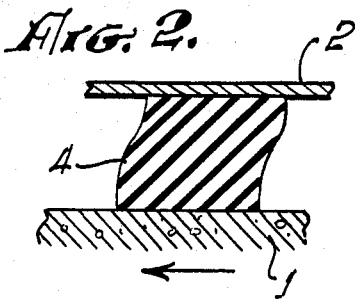
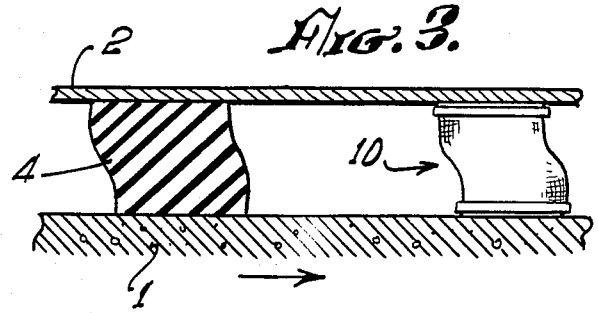
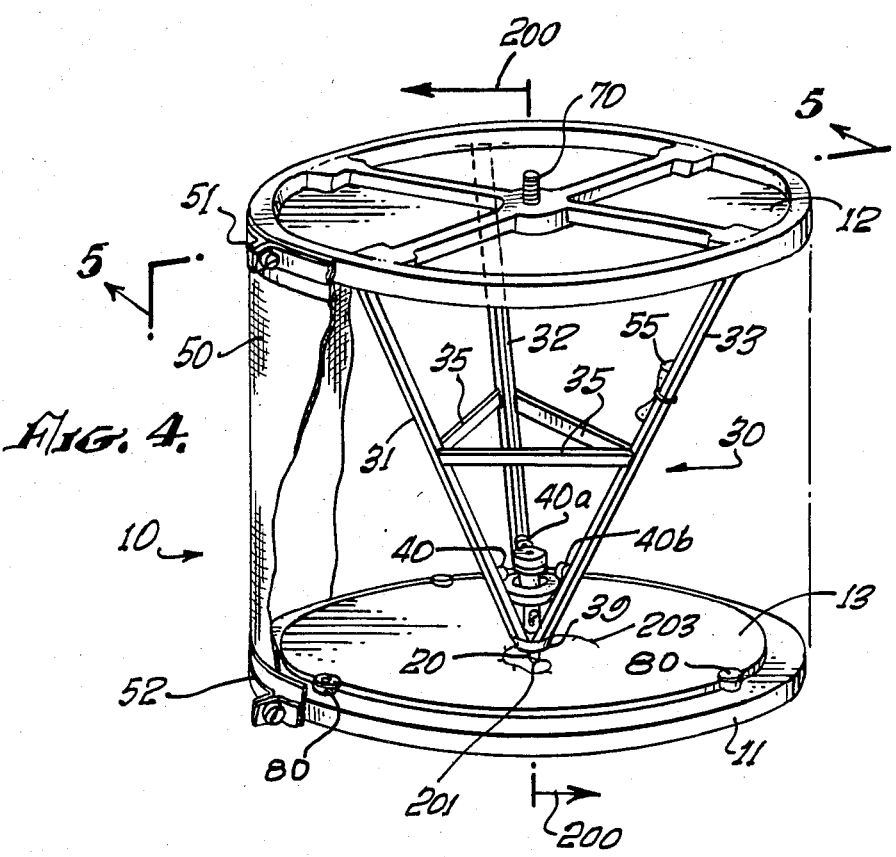

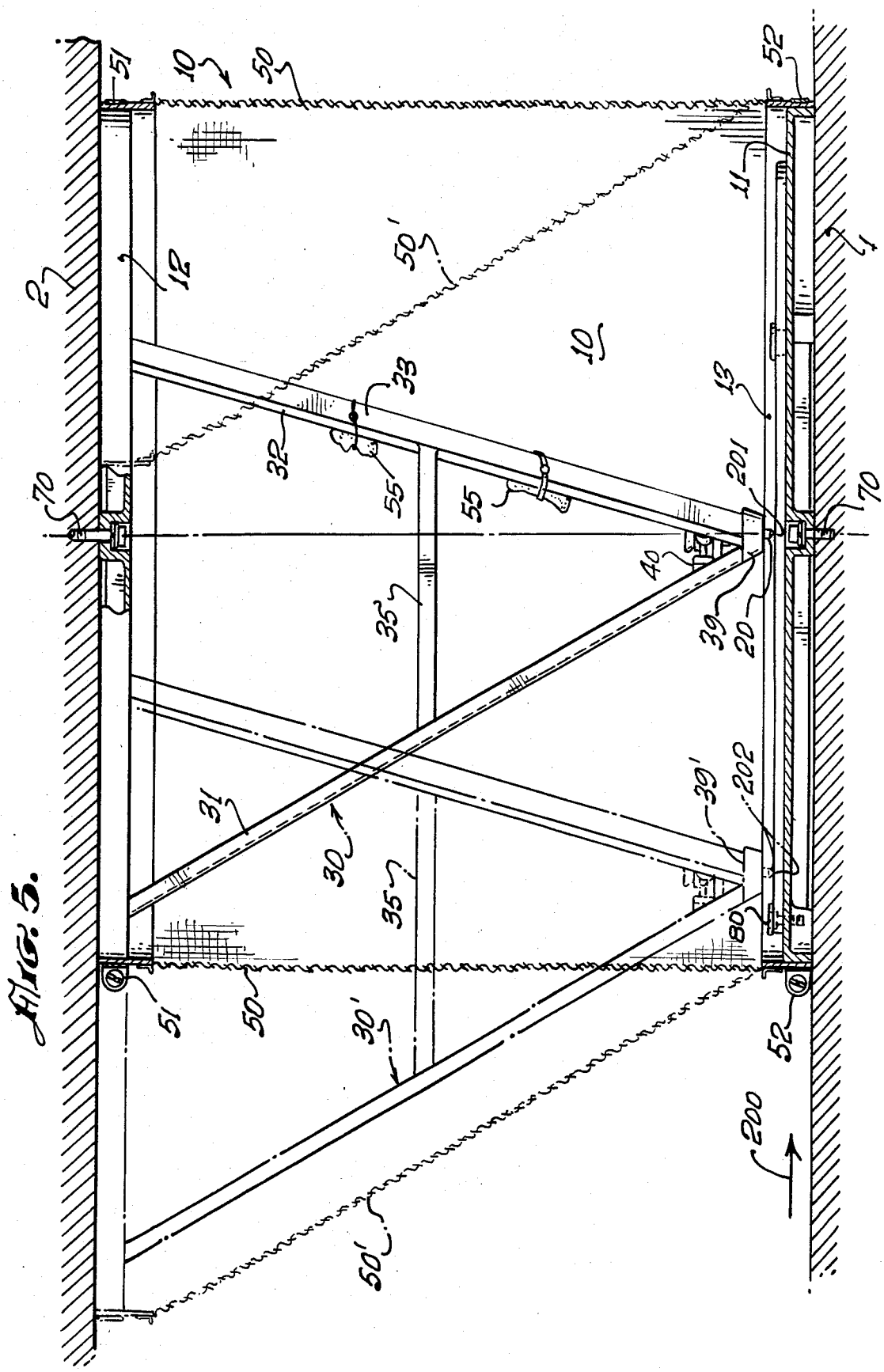

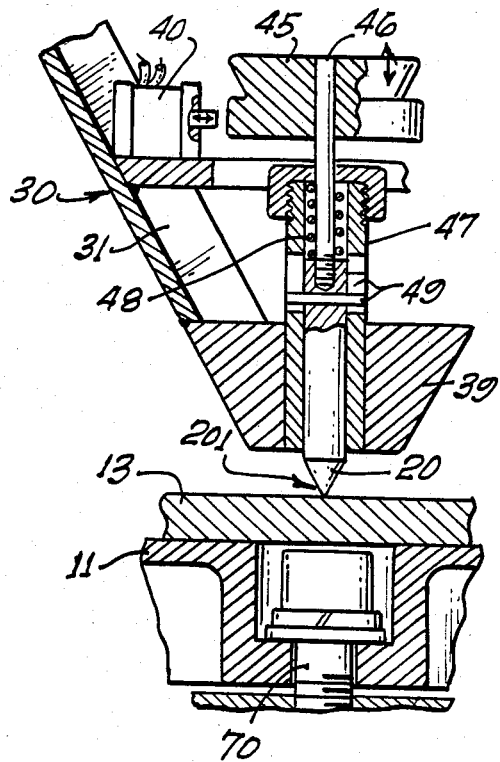
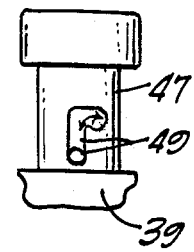
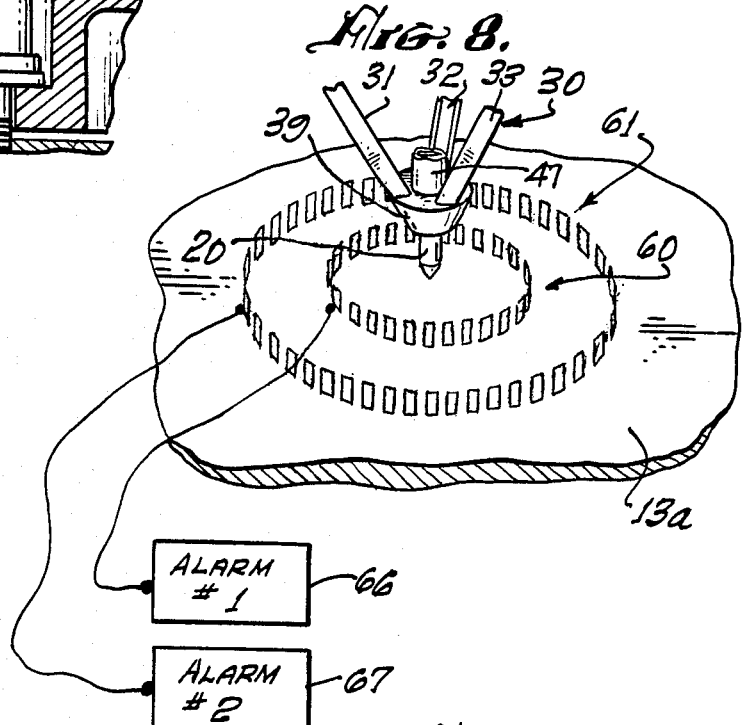
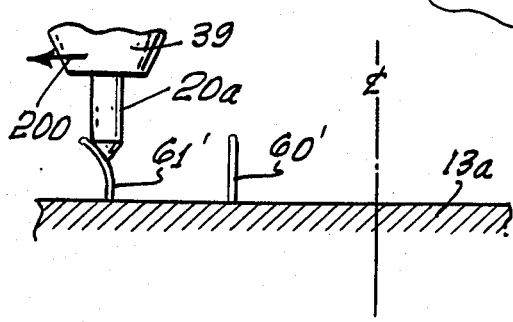
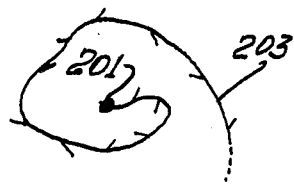

SEISMIC DISPLACEMENT RECORDER FOR BASE-ISOLATED STRUCTURES

BACKGROUND

In the design of large buildings and other structures for resistance to earthquakes, a recent practice is to isolate the base of the structure from its foundation by means of numerous large rubber or other elastomeric pads. Such structures are called base-isolated structures. In one example, a large steel-frame building has about 100 columns rising from a rigid planar base. The base is supported about 60 cm above a foundation slab on large rubber pads about 60 cm thick and 120 cm square; there are four pads positioned below the base of each column.

In an earthquake, the pads act as "shock mounts" or "vibration isolators", reducing the peak accelerations of the base of the structure compared to the corresponding accelerations of the foundation. Sudden displacements of the earth are absorbed or stored by the pads, then retransmitted more slowly to the base. During this process, there are cyclic relative displacements between the foundation and the base.

It is useful to have a record of such relative displacements after an earthquake. Relative horizontal displacements are known to be more significant than vertical. Prior recording practice is to install accelerographs in structures, then integrate the recorded data twice with respect to time to obtain displacement data. Relative displacement data require taking the difference between double-integrated acceleration data from two accelerographs, instant by instant; the process is laborious and prone to error.

It is hence desirable to provide an instrument that will record relative displacement directly.

BRIEF SUMMARY

A mechanical recording instrument according to the present invention is mounted between the base and the foundation of a base-isolated structure to directly record relative horizontal displacement between the two during an earthquake. The underside of the base and the top of the foundation are considered generally flat and of the order of 60 cm apart.

The instrument is of the type using a stylus to scratch or scribe a record line on a metallic record plate having a suitable coating. The record plate is not moved by an time-base mechanism, but remains in place. Timing marks may be provided as small pulses or pips by a mechanism to tap the stylus at intervals. Accelerographs using this recording method are shown in my prior U.S. Pat. Nos. 3,683,397; 3,740,757; 3,795,006; 3,974,504; and 4,223,319. Such instruments do not require batteries or other standby power, nor any regular maintenance.

The present instrument comprises two principal general parts. One is a rigid arm-means secured to, and extending out from, a mounting plate fastened to the structure's base (or to its foundation); the other is a record plate facing the end of the arm means and attached to a second mounting plate secured to the opposite surface of the structure—foundation or base. The end of the arm-means carries a stylus which bears on the record plate to mark it with a line when the base and foundation move relative to each other. Such a line or trace is a record of that motion.

In a practical instrument, the rigid arm means is preferably in the general form of a tripod, for rigidity with low mass. Its legs are fastened rigidly to the first mounting plate, which is preferably circular. The apex of the tripod carries the stylus. The stylus is mounted on the end of a spring-loaded plunger.

The second mounting plate, preferably similar to the first, carries the record plate on its surface. The plunger presses the stylus onto the record plate, normally at about its center in the absence of an earthquake. The springloaded plunger is disposed so as to absorb 1 or 2 cm of relative vertical displacement between base and foundation, by sliding in and out in its socket.

The whole instrument is preferably covered with a protective flexible, waterproof cover in the form of a length of large-diameter flexible tubing, such as commercial ventilating hose made of rubberized cloth or the like. This cover must bend and elongate when the upper and lower mounting plates are relatively displaced in their parallel planes. The ends of the cover slip over and around the rims of the mounting plates, where they are held in place as by suitable large circumferential bands or hose clamps.

Since building foundations are often damp, a package of desiccant is desirably provided inside the cover.

IN THE DRAWING

FIG. 1 is a simplified sectional view of a portion of a building foundation and base showing rubber isolating pads and an instrument of the invention;

FIGS. 2 and 3 show a rubber pad deflected as by an earthquake;

FIG. 4 is a perspective view of an instrument of the invention with part of the cover cut away;

FIG. 5 is a side view, partly in section, in direction 5—5 of FIG. 4, showing an instrument of the invention in more detail;

FIG. 6 is a section detail showing a stylus and a portion of a record plate;

FIG. 7 is a detail of a stylus locking mechanism;

FIG. 8 is a simplified partial perspective view of a modification of the invention;

FIG. 9 is a diagrammatic explanatory view of a portion of FIG. 8; and

FIG. 10 shows a portion of a record trace or line with timing marks.

DETAILED DESCRIPTION

FIG. 1 shows semi-diagrammatically in section a site of a typical installation of one of the present instruments. The base 2 of a building or other large stationary structure is supported spacedly above a foundation 1 by elastomeric pads, as 4, 4. Typically, the pads 4 are positioned about the bases of the structural columns, such as column 3. The space between foundation 1 and base 2 may typically be about 60 cm high. An instrument 10, according to the present invention, is also mounted in this space, the top of the instrument 10 being fastened to the underside of base 2, and the bottom to the top surface of foundation 1.

FIG. 2 indicates the deflection of an isolating pad 4 during an earthquake. FIG. 3 indicates a similar deflection, but in the opposite direction. An instrument 10 of the present invention, correspondingly deflected, is also shown in FIG. 3.

FIG. 4 shows the general structure of the instrument indicated generally at 10. A lower mounting plate 11, which is adapted to be fastened to a foundation 1 as by a screw 70, carries a record plate 13 on its surface.

Record plate 13 has a surface adapted to show a visible trace when scratched by a small-radius stylus. Such plates and styli are described in my prior U.S. Pat. Nos. 3,740,757; 3,795,006; 3,974,504; and 4,223,319.

An upper mounting plate 12, preferably similar to lower plate 11, is adapted to be fastened to the underside of structure base 2 as by a screw 70; it carries the scratch marking stylus means. This means comprises a stiff arm-like member indicated generally at 30, preferably made in the general form of a tripod having legs 31, 32, 33 with suitable bracing members 35. The upper ends of legs 31–33 are fastened to the upper mounting plate 12 as by bolts or welding.

It is obvious that the instrument 10 may be inverted, with plate 11 above and plate 12 below, and still operate, though with less convenience in replacing record plates.

The apex of the tripod 30 terminates in a cap-like member 39, from which a plunger 20 protrudes. Plunger 20 has a stylus at its tip, not shown, disposed to scratch a record trace or line on record plate 13. See also FIGS. 5 and 6.

When upper mounting plate 12 and lower mounting plate 11 are displaced horizontally in opposite directions, as indicated by arrows 200, FIG. 4, the stylus at 20 will trace their relative path on record plate 13. Such a trace is indicated at 203, FIG. 4.

FIG. 5 is a side view of the instrument 10 showing more detail, with a displaced position indicated in phantom or broken lines. Lower mounting plate 11, shown in section, may be a ribbed disc-like casting of appropriate known design, made of aluminum alloy or other suitable material. Upper plate 12 may be similar. Tripod legs 31–33 are fastened rigidly at their upper ends to plate 12. To the surface of lower mounting plate 11 is attached record plate 13 by suitable removable means, such as screws 80.

The space between the plates 11, 12 is enclosed by a flexible, extensible cover 50, which may be conveniently cut from a length of ventilating hose of the sort made of waterproof rubberized cloth and having circumferential pleats like a bellows. It is conveniently secured around the circumference of each mounting plate 11, 12 by flexible straps or hose clamps 51, 52. When, for example, the upper plate 12 is displaced to the left respective to lower plate 11, as indicated by arrow 200, FIG. 5, the arm means 30 is moved to a new position, as indicated in broken lines at 30'; and stylus plunger 20 is moved from its initial position at a point 201 to a new position at 202; a stylus trace is made. In this process, the cross section of the instrument 10, as seen from the side, changes from rectangular to rhombic. The protective cover 50 bends and stretches to accommodate the change of shape, as indicated in broken lines at 50'. A suitable container of desiccant 55 is preferably provided to keep the interior of the instrument dry.

FIGS. 6 and 7 show details of the cap 39 and the stylus and plunger mechanism. A diamond-tipped cylindrical stylus and plunger element 20 is a loose sliding fit, e.g., 0.05 mm clearance, in a bore in a stylus carrier 47. Its upper end is attached to a shaft 46 which terminates in a knob 45. It is urged downward toward and against the record plate 13 by a spring 48. When replacing the record plate 13, the stylus plunger 20 is withdrawn by pulling upward on knob 45. Knob 45 may be locked in the "up" position by a suitable pin-and-slot means, as shown at 49, FIG. 7.

Timing marks may be put in the record trace by tapping the side of knob 45 to displace plunger 20 a little in its loose-fitting bore, producing small lateral excursions in the trace. This may be done with striking or tapping devices, such as solenoids 40, FIGS. 4–6. Preferably, three such striking devices are provided, as at 40, 40a, and 40b in FIG. 4, disposed at about 120° intervals in a horizontal plane, so that whatever the direction of the trace, at least one of the small excursions will extend readably outward from the line of the trace. It is noted that the styli of this invention have small tip radii, producing traces of the order of 0.02 mm wide; thus, a small sideways "knock" of the stylus will produce a readable "pip" on the record.

Sequencing, timing, and pulse-generating circuits for actuating the striking devices 40, etc., when they are solenoids, may be of any conventional design, and are not shown. Alternatively, the striking devices 40 may be of any suitable mechanical design, energized by spring-wound motors means. The general nature of a record trace with timing marks is indicated in FIG. 10. Point 201 is the initial or starting point.

FIGS. 8 and 9 show semi-schematically a modification of the invention for actuating alarm or indicating devices (shown in block form at 66, 67) when the relative horizontal displacement between upper and lower mounting plates 11, 12 exceeds predetermined values. In FIG. 8, alarm or indication is provided at two magnitudes of displacement, which are the radii of circular arrays of contact fingers or fences 60, 61. The plunger 20 may act as a contact member, 20a. When the contact 20a touches any portion of "fence" 60, alarm or indicator 66 is actuated. Circuitry may be conventional, and is not shown. If the displacement continues to increase, contact 20a passes over "fence" 60 and continues on to the second fence 61, and so on. The contact fences are made of thin, flexible sheet metal fingers, so that they are readily bent down and passed over by the member 20a, and spring back upright after it has passed. A suitable material is 0.03 mm beryllium copper. See FIG. 9. Here, member 20a has run over one of the spring fingers 60' in fence 60 and has proceeded on to an encounter with a finger 61' in the next fence 61.

What is claimed is:

1. In a base-isolated structure having a separated base and foundation with a space therebetween,
   a seismic instrument mountable in said space for recording relative displacements between said base and foundation and comprising:
   a first mounting plate means and a rigid arm means mounted thereon and extending outwardly therefrom;
   a marking stylus means on the end portion of said arm means;
   a second mounting plate means with a record plate fastened to its surface and extending generally parallel and opposite to said first mounting plate means,
   said stylus means being engageable in marking relation with said record plate; and
   means to attach one of said mounting plate means to said base and the other of said mounting plate means to said foundation.

2. An instrument as in claim 1 wherein said rigid arm means is in the form of a tripod with its leg extremities fastened to said first mounting plate and its apex portion carrying said marking stylus means.

3. An instrument as in claim 2 wherein said marking stylus means comprises a stylus carrier member with a cylindrical bore, a plunger assembly comprising a plunger loosely slidable in said bore, a stylus tip on said plunger, and a spring means urging said plunger against said record plate.

4. An instrument as in claim 3 wherein said plunger assembly comprises a rod extending from said plunger, a knob on said rod, and a locking means on said plunger,
   said knob being adapted for raising said plunger up from said record plate, and
   said locking means being adapted to hold said plunger up to permit replacement of said record plate.

5. An instrument as in claim 4 further comprising at least one striking device disposed to impact periodically a portion of said plunger assembly to cause small lateral excursions of said stylus for timing marks.

6. An instrument as in claim 5 wherein said striking devices are three in number and disposed at 120-degree angular intervals in a horizontal plane.

7. An instrument as in claim 1 further comprising at least one generally circular fence-like array of resilient contact fingers disposed to be contacted by a portion of said plunger assembly when a said relative displacement equals about the radius of said array, and electrical signaling means actuable by said contact.

8. An instrument as in claim 7 further comprising an additional said fence-like array of radius different from the first, said fingers being adapted to be bent down and passed over by said portion of said plunger assembly and then to spring back to their original shape.

9. An instrument as in claim 1 further comprising a flexible extensible waterproof cover of generally tubular shape with its ends removably fastened to both said mounting plates so as to enclose the space between them.

10. An instrument as in claim 9 wherein said mounting plates are circular, and each end of said cover fits around the circumference of one of them, and band-like clamp means clamping the ends of said cover around said circumference.

* * * * *